Aug. 16, 1949.   E. V. GRUBEN   2,479,007
ADJUSTABLE MEASURING CUP
Filed Feb. 14, 1947
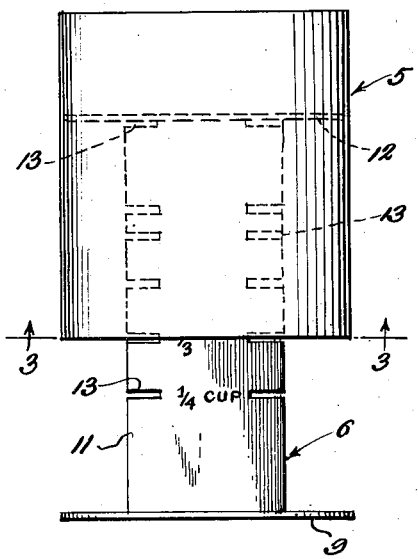
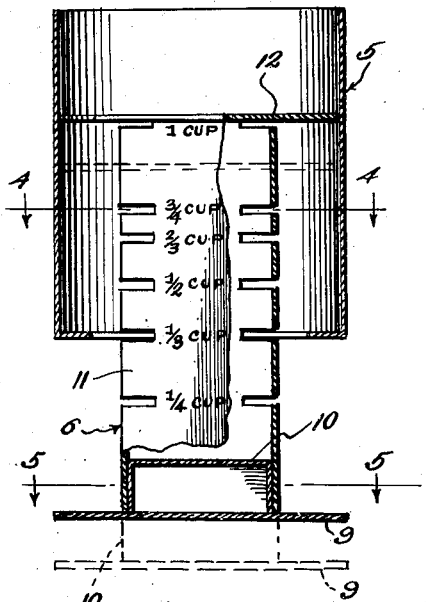
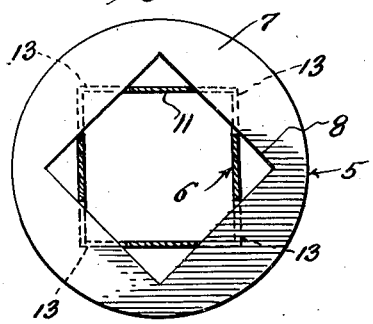
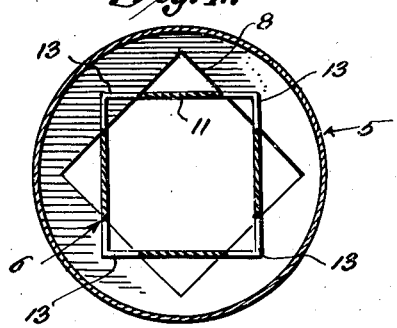
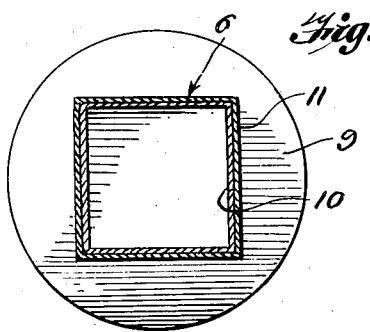
Inventor
EULA Y. GRUBEN
By *Randolph & Beaver*
Attorneys Patented Aug. 16, 1949

2,479,007

UNITED STATES PATENT OFFICE 2,479,007

ADJUSTABLE MEASURING CUP

Eula V. Gruben, Spur, Tex.

Application February 14, 1947, Serial No. 728,666

3 Claims. (Cl. 73—429)

This invention relates to measuring devices and more particularly to a device for measuring shortening, butter, margarine, lard and various other substances.

An important object of the present invention is to provide a measuring receptacle, the capacity of which can be adjusted at will in a quick and exact manner.

Another important object of the invention is to provide a measuring device including a receptacle having an adjustable bottom, which can be readily adjusted and fixed to determine the capacity of the receptacle in measuring various substances.

A further object of the invention is to provide an adjustable measuring device wherein the movable parts can be readily separated in order that they may be easily cleaned.

Still a further object of the invention is to provide an adjustable measuring device of such construction as to permit its storage in a very limited space.

These and various other objects and advantages of the invention will become apparent to the reader of the following description.

In the drawing—

Figure 1 is a side elevational view of the measuring device with the plunger extended for measuring a ⅓ cup of material;

Figure 2 is a vertical sectional view through the assembly shown in Figure 1;

Figure 3 is a cross sectional view taken on line 3—3 of Figure 1;

Figure 4 is a cross sectional view taken on line 4—4 of Figure 2;

Figure 5 is a cross section taken on line 5—5 of Figure 2.

Referring to the drawing, numeral 5 generally refers to a cup structure, while numeral 6 generally refers to a plunger structure. It is preferable that the cup structure 5 be cylindrical and have a bottom wall 7, the latter preferably having a square opening 8 therein. The cup 5 is of the usual measuring cup capacity.

The plunger 6 consists of a base 9, which may be round or some other shape and from which rises a substantially square riser 10 for snug fit within the lower portion of an elongated column 11 which is of square cross section, as shown in Figure 5, the lower end of this column 11 resting upon the base 9 and as before stated, snugly fitting the riser 10.

The upper end of the column 11 carries a disk 12, the periphery of which snugly fits the inside of the receptacle 5. If the structures 5, 6 are of sheet metal, it is apparent that the disk 12, which forms a false or adjustable bottom for the receptacle 5, can be welded or otherwise secured, as by soldering to the column 11.

The column 11 has its corner portions horizontally slotted as at 13 at predetermined intervals, it being observed that the column 11 is snugly slidable through the opening 8 in the bottom 7 of the receptacle 5, the slots 13 being of a width just sufficiently enough to receive portions of the bottom 7 when either the receptacle 5 or the column 11 is rotated with respect to the other, to the end that the receptacle 5 assumes the offset or rotated disposition on the column 11, as shown in Figure 3, as well as in Figure 4.

The slots 11 are arranged in longitudinally spaced relation and at these slots are designations indicating the capacity of the receptacle 5 when the false bottom 12 is held at a particular position within the receptacle, depending upon at which set of slots 13 the bottom 7 of the receptacle is meshing with.

Assuming that one-third cup of shortening is desired. The column 11 is pulled outwardly of the receptacle 5 until the slots designated "one-third cup" are opposite the bottom 7 of the cup 5, whereupon the column 11 is rotated so that the slots 13 at this level receive the edge portions of the bottom 7 and the opening 8.

The shortening or other material is then placed into the receptacle 5 and onto the false bottom 12 and built up to the top of the receptacle 5 where it can be leveled off by a spatula or knife.

In this manner the material can be accurately measured and by rotating the column 11 to register the sides thereof with the side to the opening 8 in the bottom 7, the column 11 can be used as a plunger for forcing the bottom 12 toward the open end of the receptacle 5 and dislodging the material from the receptacle, or, the material can be simply spooned out or otherwise discharged from the receptacle 5.

When it is desired to clean the structure, the base 9 can be pulled away from the column 11 and the column 11 and the false bottom 12 removed through the open end of the receptacle 5. The parts can then be readily cleaned and reassembled to be stored away in a limited space.

While the foregoing description sets forth the invention in specific terms, it is to be understood that numerous changes in the shape, size and materials may be resorted to without departing Having described the invention, what is claimed as new is:

1. A measuring device comprising a receptacle having a fixed bottom formed with an opening of polygonal shape, a slide structure disposed through the opening and being of polygonal cross section, the slide structure at the inner end of the receptacle being provided with a plate forming a false bottom for the receptacle, said slide structure being formed at longitudinal spaced intervals with transverse slots at each of the corners of the polygonal cross section for receiving edge portions of the fixed bottom when the slide structure is rotated with respect to the receptacle to secure said false bottom at a predetermined position within the receptacle.

2. A measuring device comprising a receptacle having a fixed bottom formed with an opening of polygonal shape, a slide structure disposed through the opening and being of polygonal cross section, the slide structure at the inner end of the receptacle being provided with a plate forming a false bottom for the receptacle, said slide structure being formed at longitudinal spaced intervals with transverse slots at each of the corners of the polygonal cross section for receiving edge portions of the fixed bottom when the slide structure is rotated with respect to the receptacle to secure said false bottom at a predetermined position within the receptacle, said slide structure being provided with a removable base at its outer end.

3. A measuring device comprising a receptacle having a fixed bottom formed with an opening of polygonal shape, a slide structure disposed through the opening and being of polygonal cross section, the slide structure at the inner end of the receptacle being provided with a plate forming a false bottom for the receptacle, said slide structure being formed at longitudinal spaced intervals with transverse slots at each of the corners of the polygonal cross section for receiving edge portions of the fixed bottom when the slide structure is rotated with respect to the receptacle to secure said false bottom at a predetermined position within the receptacle, said slide structure being provided with a removable base at its outer end, said base being provided with an outstanding riser for snug fitting disposition within the adjacent end of the sliding structure.

EULA V. GRUBEN.

REFERENCES CITED

The following references are of record in the file of this patent:

UNITED STATES PATENTS

| Number | Name | Date |
|---|---|---|
| 703,097 | Strout | June 24, 1902 |
| 1,522,156 | Thompson | Jan. 6, 1925 |
| 2,256,865 | Gilbert | Sept. 23, 1941 |